US012641284B2

(12) United States Patent
Tsai et al.

(10) Patent No.: US 12,641,284 B2
(45) Date of Patent: May 26, 2026

(54) METHOD AND APPARATUS USING CURVE BASED OR SPREAD-ANGLE BASED INTRA PREDICTION MODE IN VIDEO CODING SYSTEM

(71) Applicant: MEDIATEK INC., Hsinchu City (TW)

(72) Inventors: Chia-Ming Tsai, Hsinchu City (TW);
Chun-Chia Chen, Hsinchu City (TW);
Man-Shu Chiang, Hsinchu City (TW);
Yu-Cheng Lin, Hsinchu City (TW);
Chih-Wei Hsu, Hsinchu City (TW);
Tzu-Der Chuang, Hsinchu City (TW);
Ching-Yeh Chen, Hsinchu City (TW);
Yu-Wen Huang, Hsinchu City (TW)

(73) Assignee: MEDIATEK INC., Hsinchu City (TW)

( * ) Notice: Subject to any disclaimer, the term of this patent is extended or adjusted under 35 U.S.C. 154(b) by 51 days.

(21) Appl. No.: 18/854,751

(22) PCT Filed: Feb. 8, 2023

(86) PCT No.: PCT/CN2023/074904
§ 371 (c)(1),
(2) Date: Oct. 7, 2024

(87) PCT Pub. No.: WO2023/193516
PCT Pub. Date: Oct. 12, 2023

(65) Prior Publication Data
US 2025/0234034 A1 Jul. 17, 2025

Related U.S. Application Data

(60) Provisional application No. 63/328,770, filed on Apr. 8, 2022.

(51) Int. Cl.
H04N 19/593 (2014.01)
H04N 19/11 (2014.01)
(Continued)

(52) U.S. Cl.
CPC ........... H04N 19/593 (2014.11); H04N 19/11 (2014.11); H04N 19/136 (2014.11);
(Continued)

(58) Field of Classification Search
CPC .... H04N 19/70; H04N 19/136; H04N 19/593; H04N 19/147; H04N 19/11; H04N 19/176
See application file for complete search history.

(56) References Cited

U.S. PATENT DOCUMENTS

| | | | |
|---|---|---|---|
| 10,652,575 B2 | 5/2020 | Zhang | |
| 2009/0232215 A1 | 9/2009 | Park | |

(Continued)

FOREIGN PATENT DOCUMENTS

| | | |
|---|---|---|
| TW | 201817236 A | 5/2018 |
| TW | 202005370 A | 1/2020 |
| WO | 2020197203 A1 | 10/2020 |

OTHER PUBLICATIONS

International Search Report and Written Opinion dated Jun. 16, 2023, issued in application No. PCT/CN2023/074904.

(Continued)

*Primary Examiner* — Neil R Mikeska
(74) *Attorney, Agent, or Firm* — McClure, Qualey & Rodack, LLP

(57) ABSTRACT

A method and apparatus for video coding. According to the method for the decoder side, coded data associated with a current block to be decoded is received. A curved intra prediction model associated with a curved intra prediction mode is determined for the current block, where the curved intra prediction model is derived based on a template of the current block or based on decoder side intra mode derivation using statistics or histogram of angle field derived from the template of the current block. The template comprises at (Continued)

least 3 lines in a neighbouring region of the current block. The current block is decoded using one or more intra prediction mode candidates including the curved intra prediction mode.

19 Claims, 12 Drawing Sheets

(51) Int. Cl.
| | |
|---|---|
| *H04N 19/136* | (2014.01) |
| *H04N 19/147* | (2014.01) |
| *H04N 19/176* | (2014.01) |
| *H04N 19/70* | (2014.01) |

(52) U.S. Cl.
CPC ......... *H04N 19/147* (2014.11); *H04N 19/176* (2014.11); *H04N 19/70* (2014.11)

(56) References Cited

U.S. PATENT DOCUMENTS

| | | | |
|---|---|---|---|
| 2016/0073107 A1 | 3/2016 | Moon | |
| 2017/0374369 A1 | 12/2017 | Chuang | |
| 2019/0253624 A1 | 8/2019 | Kim | |
| 2023/0090700 A1* | 3/2023 | Teng .................... | H04N 19/105 |
| | | | 375/240.02 |
| 2023/0124010 A1* | 4/2023 | Cao ..................... | H04N 19/159 |
| | | | 382/168 |
| 2023/0308636 A1 | 9/2023 | Li | |
| 2024/0146907 A1* | 5/2024 | Deng ................... | H04N 19/105 |
| 2024/0223802 A1* | 7/2024 | Zhou ..................... | H04N 19/11 |

OTHER PUBLICATIONS

Chinese language office action dated Apr. 3, 2024, issued in application No. TW 112113087.

* cited by examiner

SPLIT_BT_VER          SPLIT_BT_HOR          SPLIT_TT_VER          SPLIT_TT_HOR

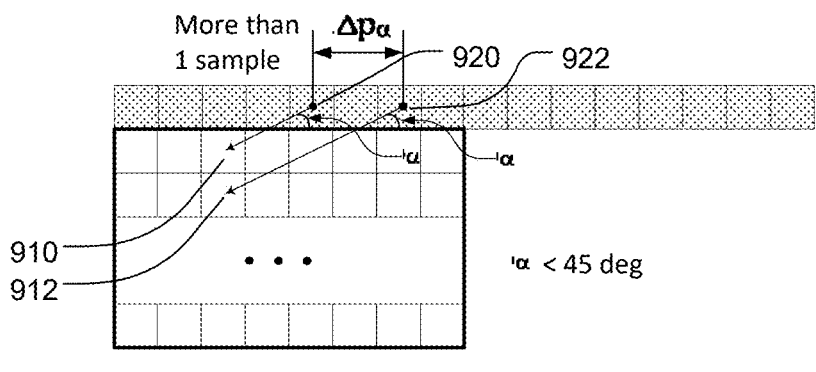
*Fig. 9*
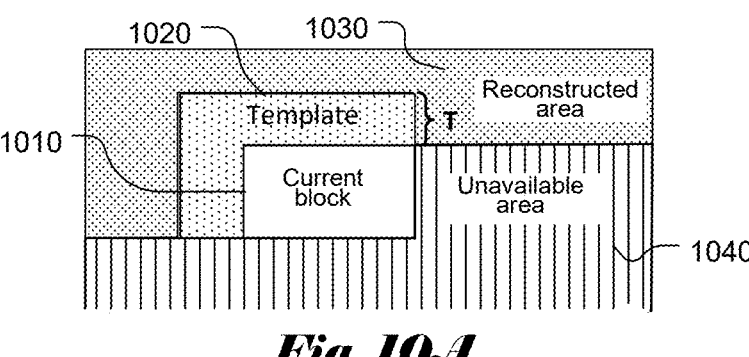
*Fig. 10A*
*Fig. 10B*
*Fig. 10C*

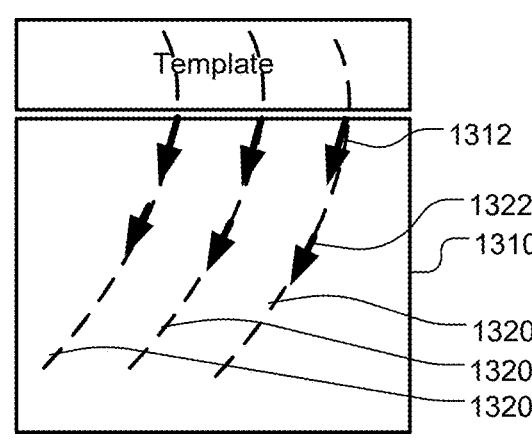
*Fig. 13*
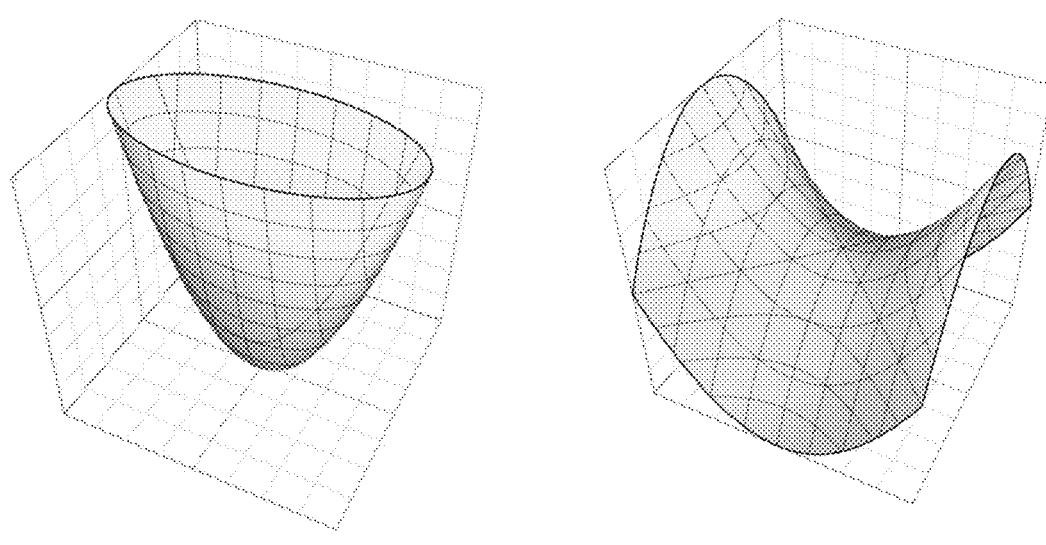
*Fig. 14A* *Fig. 14B*
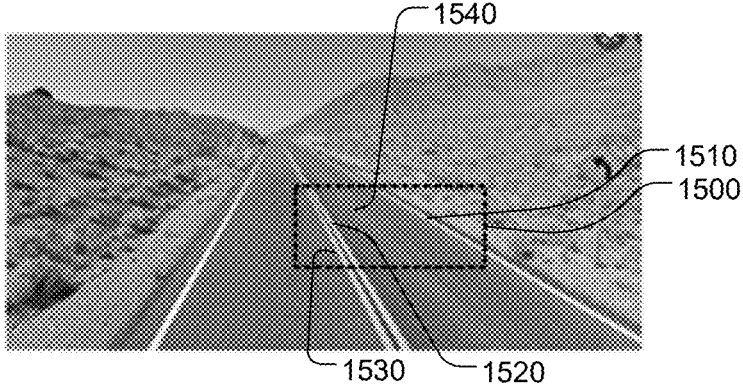
*Fig. 15*

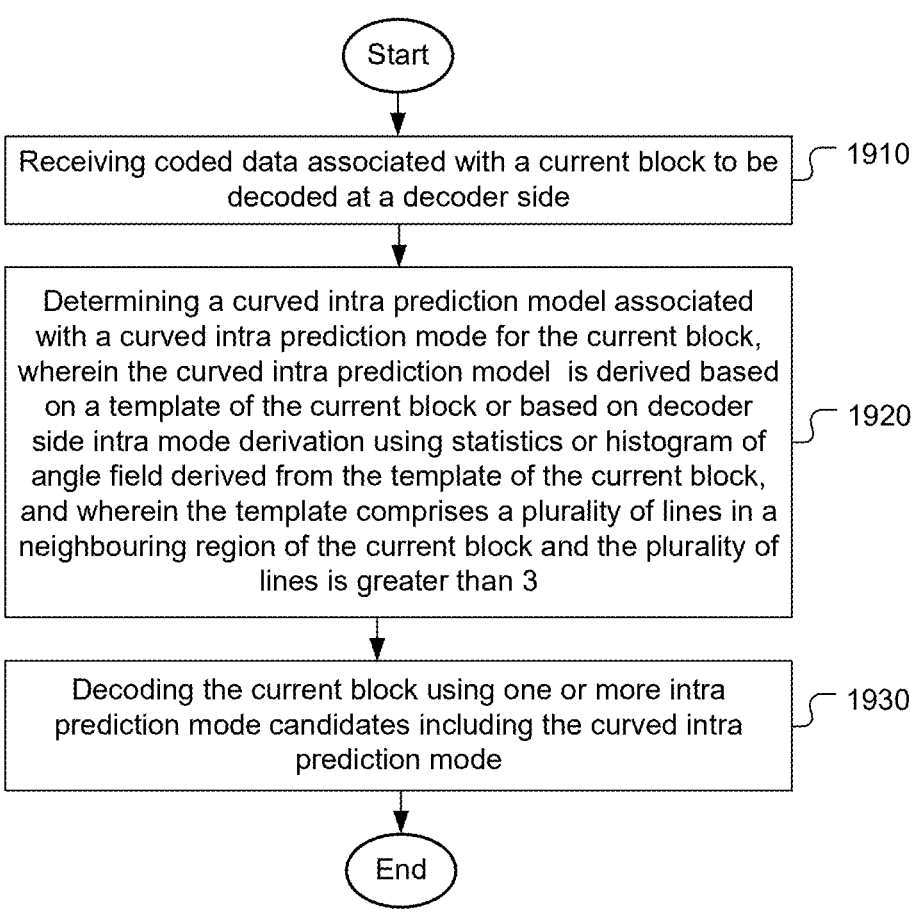

Start

Receiving coded data associated with a current block to be decoded at a decoder side          ⌐ 1910

Determining a curved intra prediction model associated with a curved intra prediction mode for the current block, wherein the curved intra prediction model is derived based on a template of the current block or based on decoder side intra mode derivation using statistics or histogram of angle field derived from the template of the current block, and wherein the template comprises a plurality of lines in a neighbouring region of the current block and the plurality of lines is greater than 3          ⌐ 1920

Decoding the current block using one or more intra prediction mode candidates including the curved intra prediction mode          ⌐ 1930

End

*Fig. 19*

METHOD AND APPARATUS USING CURVE BASED OR SPREAD-ANGLE BASED INTRA PREDICTION MODE IN VIDEO CODING SYSTEM

CROSS REFERENCE TO RELATED APPLICATIONS

The present invention is a non-Provisional Application of and claims priority to U.S. Provisional Patent Application No. 63/328,770, filed on Apr. 8, 2022. The U.S. Provisional Patent Application is hereby incorporated by reference in its entirety.

FIELD OF THE INVENTION

The present invention relates to video coding system. In particular, the present invention relates to curved intra prediction in a video coding system.

BACKGROUND

Versatile video coding (VVC) is the latest international video coding standard developed by the Joint Video Experts Team (JVET) of the ITU-T Video Coding Experts Group (VCEG) and the ISO/IEC Moving Picture Experts Group (MPEG). The standard has been published as an ISO standard: ISO/IEC 23090-3:2021, Information technology-Coded representation of immersive media-Part 3: Versatile video coding, published February 2021. VVC is developed based on its predecessor HEVC (High Efficiency Video Coding) by adding more coding tools to improve coding efficiency and also to handle various types of video sources including 3-dimensional (3D) video signals.

FIG. 1A illustrates an exemplary adaptive Inter/Intra video coding system incorporating loop processing. For Intra Prediction, the prediction data is derived based on previously coded video data in the current picture. For Inter Prediction 112, Motion Estimation (ME) is performed at the encoder side and Motion Compensation (MC) is performed based of the result of ME to provide prediction data derived from other picture(s) and motion data. Switch 114 selects Intra Prediction 110 or Inter-Prediction 112 and the selected prediction data is supplied to Adder 116 to form prediction errors, also called residues. The prediction error is then processed by Transform (T) 118 followed by Quantization (Q) 120. The transformed and quantized residues are then coded by Entropy Encoder 122 to be included in a video bitstream corresponding to the compressed video data. The bitstream associated with the transform coefficients is then packed with side information such as motion and coding modes associated with Intra prediction and Inter prediction, and other information such as parameters associated with loop filters applied to underlying image area. The side information associated with Intra Prediction 110, Inter prediction 112 and in-loop filter 130, are provided to Entropy Encoder 122 as shown in FIG. 1A. When an Inter-prediction mode is used, a reference picture or pictures have to be reconstructed at the encoder end as well. Consequently, the transformed and quantized residues are processed by Inverse Quantization (IQ) 124 and Inverse Transformation (IT) 126 to recover the residues. The residues are then added back to prediction data 136 at Reconstruction (REC) 128 to reconstruct video data. The reconstructed video data may be stored in Reference Picture Buffer 134 and used for prediction of other frames.

As shown in FIG. 1A, incoming video data undergoes a series of processing in the encoding system. The reconstructed video data from REC 128 may be subject to various impairments due to a series of processing. Accordingly, in-loop filter 130 is often applied to the reconstructed video data before the reconstructed video data are stored in the Reference Picture Buffer 134 in order to improve video quality. For example, deblocking filter (DF), Sample Adaptive Offset (SAO) and Adaptive Loop Filter (ALF) may be used. The loop filter information may need to be incorporated in the bitstream so that a decoder can properly recover the required information. Therefore, loop filter information is also provided to Entropy Encoder 122 for incorporation into the bitstream. In FIG. 1A, Loop filter 130 is applied to the reconstructed video before the reconstructed samples are stored in the reference picture buffer 134. The system in FIG. 1A is intended to illustrate an exemplary structure of a typical video encoder. It may correspond to the High Efficiency Video Coding (HEVC) system, VP8, VP9, H.264 or VVC.

The decoder, as shown in FIG. 1B, can use similar or portion of the same functional blocks as the encoder except for Transform 118 and Quantization 120 since the decoder only needs Inverse Quantization 124 and Inverse Transform 126. Instead of Entropy Encoder 122, the decoder uses an Entropy Decoder 140 to decode the video bitstream into quantized transform coefficients and needed coding information (e.g. ILPF information, Intra prediction information and Inter prediction information). The Intra prediction 150 at the decoder side does not need to perform the mode search. Instead, the decoder only needs to generate Intra prediction according to Intra prediction information received from the Entropy Decoder 140. Furthermore, for Inter prediction, the decoder only needs to perform motion compensation (MC 152) according to Inter prediction information received from the Entropy Decoder 140 without the need for motion estimation.

According to VVC, an input picture is partitioned into non-overlapped square block regions referred as CTUs (Coding Tree Units), similar to HEVC. Each CTU can be partitioned into one or multiple smaller size coding units (CUs). The resulting CU partitions can be in square or rectangular shapes. Also, VVC divides a CTU into prediction units (PUs) as a unit to apply prediction process, such as Inter prediction, Intra prediction, etc.

The VVC standard incorporates various new coding tools to further improve the coding efficiency over the HEVC standard. Among various new coding tools, some coding tools relevant to the present invention are reviewed as follows.

Partitioning of the CTUs Using a Tree Structure

In HEVC, a CTU is split into CUs by using a quaternary-tree (QT) structure denoted as coding tree to adapt to various local characteristics. The decision whether to code a picture area using inter-picture (temporal) or intra-picture (spatial) prediction is made at the leaf CU level. Each leaf CU can be further split into one, two or four Pus according to the PU splitting type. Inside one PU, the same prediction process is applied and the relevant information is transmitted to the decoder on a PU basis. After obtaining the residual block by applying the prediction process based on the PU splitting type, a leaf CU can be partitioned into transform units (TUs) according to another quaternary-tree structure similar to the coding tree for the CU. One of key feature of the HEVC structure is that it has the multiple partition conceptions including CU, PU, and TU.

In VVC, a quadtree with nested multi-type tree using binary and ternary splits segmentation structure replaces the concepts of multiple partition unit types, i.e. it removes the separation of the CU, PU and TU concepts except as needed for CUs that have a size too large for the maximum transform length, and supports more flexibility for CU partition shapes. In the coding tree structure, a CU can have either a square or rectangular shape. A coding tree unit (CTU) is first partitioned by a quaternary tree (a.k.a. quadtree) structure. Then the quaternary tree leaf nodes can be further partitioned by a multi-type tree structure. As shown in FIG. 2, there are four splitting types in multi-type tree structure, vertical binary splitting (SPLIT_BT_VER 210), horizontal binary splitting (SPLIT_BT_HOR 220), vertical ternary splitting (SPLIT_TT_VER 230), and horizontal ternary splitting (SPLIT_TT_HOR 240). The multi-type tree leaf nodes are called coding units (CUs), and unless the CU is too large for the maximum transform length, this segmentation is used for prediction and transform processing without any further partitioning. This means that, in most cases, the CU, PU and TU have the same block size in the quadtree with nested multi-type tree coding block structure. The exception occurs when maximum supported transform length is smaller than the width or height of the colour component of the CU.

FIG. 3 illustrates the signalling mechanism of the partition splitting information in quadtrec with nested multi-type tree coding tree structure. A coding tree unit (CTU) is treated as the root of a quaternary tree and is first partitioned by a quaternary tree structure. Each quaternary tree leaf node (when sufficiently large to allow it) is then further partitioned by a multi-type tree structure. In the multi-type tree structure, a first flag (mtt_split_cu_flag) is signalled to indicate whether the node is further partitioned; when a node is further partitioned, a second flag (mtt_split_cu_vertical_flag) is signalled to indicate the splitting direction, and then a third flag (mtt_split_cu_binary_flag) is signalled to indicate whether the split is a binary split or a ternary split. Based on the values of mtt_split_cu_vertical_flag and mtt_split_cu_binary_flag, the multi-type tree slitting mode (MttSplitMode) of a CU is derived as shown in Table 1.

TABLE 1

| MttSplitMode derviation based on multi-type tree syntax elements | | |
|---|---|---|
| MttSplitMode | mtt_split_cu_vertical_flag | mtt_split_cu_binary_flag |
| SPLIT_TT_HOR | 0 | 0 |
| SPLIT_BT_HOR | 0 | 1 |
| SPLIT_TT_VER | 1 | 0 |
| SPLIT_BT_VER | 1 | 1 |

FIG. 4 shows a CTU divided into multiple CUs with a quadtree and nested multi-type tree coding block structure, where the bold block edges represent quadtree partitioning and the remaining edges represent multi-type tree partitioning. The quadtree with nested multi-type tree partition provides a content-adaptive coding tree structure comprised of CUs. The size of the CU may be as large as the CTU or as small as 4×4 in units of luma samples. For the case of the 4:2:0 chroma format, the maximum chroma CB size is 64×64 and the minimum size chroma CB consist of 16 chroma samples.

In VVC, the maximum supported luma transform size is 64×64 and the maximum supported chroma transform size is 32×32. When the width or height of the CB is larger the maximum transform width or height, the CB is automatically split in the horizontal and/or vertical direction to meet the transform size restriction in that direction.

The following parameters are defined and specified by SPS syntax elements for the quadtrec with nested multi-type tree coding tree scheme.

CTU size: the root node size of a quaternary tree

MinQTSize: the minimum allowed quaternary tree leaf node size

MaxBtSize: the maximum allowed binary tree root node size

MaxTtSize: the maximum allowed ternary tree root node size

MaxMttDepth: the maximum allowed hierarchy depth of multi-type tree splitting from a quadtree leaf MinBtSize: the minimum allowed binary tree leaf node size MinTtSize: the minimum allowed ternary tree leaf node size In one example of the quadtree with nested multi-type tree coding tree structure, the CTU size is set as 128×128 luma samples with two corresponding 64×64 blocks of 4:2:0 chroma samples, the MinQTSize is set as 16×16, the MaxBtSize is set as 128×128 and MaxTtSize is set as 64×64, the MinBtSize and MinTtSize (for both width and height) is set as 4×4, and the MaxMttDepth is set as 4. The quaternary tree partitioning is applied to the CTU first to generate quaternary tree leaf nodes. The quaternary tree leaf nodes may have a size from 16×16 (i.e., the MinQTSize) to 128×128 (i.e., the CTU size). If the leaf QT node is 128×128, it will not be further split by the binary tree since the size exceeds the MaxBtSize and MaxTtSize (i.e., 64×64). Otherwise, the leaf qdtree node could be further partitioned by the multi-type tree. Therefore, the quaternary tree leaf node is also the root node for the multi-type tree and it has multi-type tree depth (mttDepth) as 0. When the multi-type trece depth reaches MaxMttDepth (i.e., 4), no further splitting is considered. When the multi-type trec node has width equal to MinBtSize and smaller or equal to 2*MinTtSize, no further horizontal splitting is considered. Similarly, when the multi-type tree node has height equal to MinBtSize and smaller or equal to 2*MinTtSize, no further vertical splitting is considered.

To allow 64×64 Luma block and 32×32 Chroma pipelining design in VVC hardware decoders, TT split is forbidden when either width or height of a luma coding block is larger than 64, as shown in FIG. 5, where block 500 corresponds to a 128×128 luma CU. The CU can be split using vertical binary partition (510) or horizontal binary partition (520). After the block is split into 4 CUs, each size is 64×64, the CU can be further partitioned using partitions including TT. For example, the upper-left 64×64 CU is partitioned using vertical ternary splitting (530) or horizontal ternary splitting (540). TT split is also forbidden when either width or height of a chroma coding block is larger than 32.

In VVC, the coding tree scheme supports the ability for the luma and chroma to have a separate block tree structure. For P and B slices, the luma and chroma CTBs in one CTU have to share the same coding tree structure. However, for I slices, the luma and chroma can have separate block tree structures. When the separate block tree mode is applied, luma CTB is partitioned into CUs by one coding tree structure, and the chroma CTBs are partitioned into chroma CUs by another coding tree structure. This means that a CU in an I slice may consist of a coding block of the luma component or coding blocks of two chroma components, and a CU in a P or B slice always consists of coding blocks of all three colour components unless the video is monochrome.

Virtual Pipeline Data Units (VPDUs)

Virtual pipeline data units (VPDUs) are defined as non-overlapping units in a picture. In hardware decoders, successive VPDUs are processed by multiple pipeline stages at the same time. The VPDU size is roughly proportional to the buffer size in most pipeline stages, so it is important to keep the VPDU size small. In most hardware decoders, the VPDU size can be set to maximum transform block (TB) size. However, in VVC, ternary tree (TT) and binary tree (BT) partition may lead to the increasing of VPDUs size.

In order to keep the VPDU size as 64×64 luma samples, the following normative partition restrictions (with syntax signalling modification) are applied in VTM, as shown in FIG. 6:

TT split is not allowed (as indicated by "X" in FIG. 6) for a CU with either width or height, or both width and height equal to 128.

For a 128×N CU with N≤64 (i.e. width equal to 128 and height smaller than 128), horizontal BT is not allowed.

For an N×128 CU with N≤64 (i.e. height equal to 128 and width smaller than 128), vertical BT is not allowed. In FIG. 6, the luma block size is 128×128. The dashed lines indicate block size 64×64. According to the constraints mentioned above, examples of the partitions not allowed are indicated by "X" as shown in various examples (610-680) in FIG. 6.

Intra Mode Coding with 67 Intra Prediction Modes

To capture the arbitrary edge directions presented in natural video, the number of directional intra modes in VVC is extended from 33, as used in HEVC, to 65. The new directional modes not in HEVC are depicted as red dotted arrows in FIG. 7, and the planar and DC modes remain the same. These denser directional intra prediction modes apply for all block sizes and for both luma and chroma intra predictions.

In VVC, several conventional angular intra prediction modes are adaptively replaced with wide-angle intra prediction modes for the non-square blocks.

In HEVC, every intra-coded block has a square shape and the length of each of its side is a power of 2. Thus, no division operations are required to generate an intra-predictor using DC mode. In VVC, blocks can have a rectangular shape that necessitates the use of a division operation per block in the general case. To avoid division operations for DC prediction, only the longer side is used to compute the average for non-square blocks.

To keep the complexity of the most probable mode (MPM) list generation low, an intra mode coding method with 6 MPMs is used by considering two available neighbouring intra modes. The following three aspects are considered to construct the MPM list:

Default intra modes
  Neighbouring intra modes
  Derived intra modes.

A unified 6-MPM list is used for intra blocks irrespective of whether MRL and ISP coding tools are applied or not. The MPM list is constructed based on intra modes of the left and above neighbouring block. Suppose the mode of the left is denoted as Left and the mode of the above block is denoted as Above, the unified MPM list is constructed as follows:

When a neighbouring block is not available, its intra mode is set to Planar by default.

If both modes Left and Above are non-angular modes:
    MPM list→{Planar, DC, V, H, V-4, V+4}

If one of modes Left and Above is angular mode, and the other is non-angular:
    Set a mode Max as the larger mode in Left and Above
    MPM list→{Planar, Max, DC, Max-1, Max+1, Max-2}

If Left and Above are both angular and they are different:
    Set a mode Max as the larger mode in Left and Above
    if the difference of mode Left and Above is in the range of 2 to 62, inclusive
      MPM list→{Planar, Left, Above, DC, Max-1, Max+1}
    Otherwise.
      MPM list→{Planar, Left, Above, DC, Max-2, Max+2}

If Left and Above are both angular and they are the same:
    MPM list→{Planar, Left, Left-1, Left+1, DC, Left-2}

Besides, the first bin of the MPM index codeword is CABAC context coded. In total three contexts are used, corresponding to whether the current intra block is MRL enabled, ISP enabled, or a normal intra block.

During 6 MPM list generation process, pruning is used to remove duplicated modes so that only unique modes can be included into the MPM list. For entropy coding of the 61 non-MPM modes, a Truncated Binary Code (TBC) is used.

Wide-Angle Intra Prediction for Non-Square Blocks

Conventional angular intra prediction directions are defined from 45 degrees to −135 degrees in clockwise direction. In VVC, several conventional angular intra prediction modes are adaptively replaced with wide-angle intra prediction modes for non-square blocks. The replaced modes are signalled using the original mode indexes, which are remapped to the indexes of wide angular modes after parsing. The total number of intra prediction modes is unchanged, i.e., 67, and the intra mode coding method is unchanged.

To support these prediction directions, the top reference with length 2W+1, and the left reference with length 2H+1, are defined as shown in FIG. 8A and FIG. 8B respectively.

The number of replaced modes in wide-angular direction mode depends on the aspect ratio of a block. The replaced intra prediction modes are illustrated in Table 2.

TABLE 2

| Intra prediction modes replaced by wide-angular modes | |
| --- | --- |
| Aspect ratio | Replaced intra prediction modes |
| W/H == 16 | Modes 12, 13, 14, 15 |
| W/H == 8 | Modes 12, 13 |
| W/H == 4 | Modes 2, 3, 4, 5, 6, 7, 8, 9, 10, 11 |
| W/H == 2 | Modes 2, 3, 4, 5, 6, 7, |
| W/H == 1 | None |
| W/H == ½ | Modes 61, 62, 63, 64, 65, 66 |
| W/H == ¼ | Mode 57, 58, 59, 60, 61, 62, 63, 64, 65, 66 |
| W/H == ⅛ | Modes 55, 56 |
| W/H == 1/16 | Modes 53, 54, 55, 56 |

As shown in FIG. 9, two vertically-adjacent predicted samples (samples 910 and 912) may use two non-adjacent reference samples (samples 920 and 922) in the case of wide-angle intra prediction. Hence, low-pass reference samples filter and side smoothing are applied to the wide-angle prediction to reduce the negative effect of the increased gap $\Delta p_\alpha$. If a wide-angle mode represents a non-fractional offset, there are 8 modes in the wide-angle modes satisfy this condition, which are [−14, −12, −10, −6, 72, 76, 78, 80]. When a block is predicted by these modes, the samples in the reference buffer are directly copied without applying any interpolation. With this modification, the number of samples needed to be smoothing is reduced. Besides, it aligns the design of non-fractional modes in the conventional prediction modes and wide-angle modes.

In VVC, 4:2:2 and 4:4:4 chroma formats are supported as well as 4:2:0. Chroma derived mode (DM) derivation table for 4:2:2 chroma format was initially ported from HEVC extending the number of entries from 35 to 67 to align with refIdx is equal to 0 (no MRL)
TU size is greater than 32
Luma
No ISP block
Otherwise, if a mode is classified as belonging to group C, MRL index is equal to 0, and the current block is not ISP block, then only an intra reference sample interpolation filter is applied to reference samples to generate a predicted sample that falls into a fractional or integer position between reference samples according to a selected direction (no reference sample filtering is performed). The interpolation filter type is determined as follows:

Set minDist VerHor equal to Min(Abs(predModeIntra−50), Abs(predModeIntra−18))
Set nTbS equal to (Log2 (W)+Log2 (H))>>1
Set intraHorVerDistThres [nTbS] as specified below:

| | nTbS = 2 | nTbS = 3 | nTbS = 4 | nTbS = 5 | nTbS = 6 | nTbS = 7 |
|---|---|---|---|---|---|---|
| intraHorVerDistThres[nTbS] | 24 | 14 | 2 | 0 | 0 | 0 | the extension of intra prediction modes. Since HEVC specification does not support prediction angle below −135° and above 45°, luma intra prediction modes ranging from 2 to 5 are mapped to 2. Therefore, chroma DM derivation table for 4:2:2 chroma format is updated by replacing some values of the entries of the mapping table to convert prediction angle more precisely for chroma blocks.

4-Tap Interpolation Filter and Reference Sample Smoothing

Four-tap intra interpolation filters are utilized to improve the directional intra prediction accuracy. In HEVC, a two-tap linear interpolation filter has been used to generate the intra prediction block in the directional prediction modes (i.e., excluding Planar and DC predictors). In VVC, the two sets of 4-tap IFs (interpolation filters) replace lower precision linear interpolation as in HEVC, where one is a DCT-based interpolation filter (DCTIF) and the other one is a 4-tap smoothing interpolation filter (SIF). The DCTIF is constructed in the same way as the one used for chroma component motion compensation in both HEVC and VVC. The SIF is obtained by convolving the 2-tap linear interpolation filter with [1 2 1]/4 filter.

Depending on the intra prediction mode, the following reference samples processing is performed:

The directional intra-prediction mode is classified into one of the following groups:

Group A: vertical or horizontal modes (HOR_IDX, VER_IDX),

Group B: directional modes that represent non-fractional angles (−14, −12, −10, −6, 2, 34, 66, 72, 76, 78, 80,) and Planar mode, Group C: remaining directional modes;

If the directional intra-prediction mode is classified as belonging to group A, then no filters are applied to the reference samples to generate the predicted samples;

Otherwise, if a mode falls into group B and the mode is a directional mode, and all of following conditions are true, then a [1, 2, 1] reference sample filter may be applied (depending on the MDIS condition) to the reference samples to further copy these filtered values into an intra predictor according to the selected direction, but no interpolation filters are applied:

If minDist VerHor is greater than intraHor VerDistThres [nTbS], SIF is used for the interpolation
Otherwise, DCTIF is used for the interpolation

Decoder Side Intra Mode Derivation (DIMD)

When DIMD is applied, two intra modes are derived from the reconstructed neighbour samples, and those two predictors are combined with the planar mode predictor with the weights derived from the gradients. The DIMD mode is used as an alternative prediction mode and is always checked in the high-complexity RDO mode.

To implicitly derive the intra prediction modes of a block, a texture gradient analysis is performed at both the encoder and decoder sides. This process starts with an empty Histogram of Gradient (HoG) with 65 entries, corresponding to the 65 angular modes. Amplitudes of these entries are determined during the texture gradient analysis.

In the first step, DIMD picks a template of T=3 columns and lines from respectively left side and above side of the current block. This area is used as the reference for the gradient based intra prediction modes derivation.

In the second step, the horizontal and vertical Sobel filters are applied on all 3×3 window positions, centered on the pixels of the middle line of the template. At each window position, Sobel filters calculate the intensity of pure horizontal and vertical directions as Gy and Gy, respectively. Then, the texture angle of the window is calculated as:

$$angle = \arctan(G_x / G_y), \qquad (1)$$

which can be converted into one of 65 angular intra prediction modes. Once the intra prediction mode index of current window is derived as idx, the amplitude of its entry in the HoG[idx] is updated by addition of:

$$ampl = |G_x| + |G_y| \qquad (2)$$

FIGS. 10A-C show an example of HoG, calculated after applying the above operations on all pixel positions in the template. FIG. 10A illustrates an example of selected template 1020 for a current block 1010. Template 1020 comprises T lines above the current block and T columns to the left of the current block. For intra prediction of the current block, the area 1030 at the above and left of the current block corresponds to a reconstructed area and the area 1040 below and at the right of the block corresponds to an unavailable area. FIG. 10B illustrates an example for T=3 and the HoGs are calculated for pixels 1060 in the middle line and pixels 1062 in the middle column. For example, for pixel 1052, a 3×3 window 1050 is used. FIG. 10C illustrates an example of the amplitudes (ampl) calculated based on equation (2) for the angular intra prediction modes as determined from equation (1).

Once HoG is computed, the indices with two tallest histogram bars are selected as the two implicitly derived intra prediction modes for the block and are further combined with the Planar mode as the prediction of DIMD mode. The prediction fusion is applied as a weighted average of the above three predictors. To this aim, the weight of planar is fixed to 21/64 (~⅓). The remaining weight of 43/64 (~⅔) is then shared between the two HoG IPMs, proportionally to the amplitude of their HoG bars. FIG. 11 illustrates an example of the blending process. As shown in FIG. 11, two intra modes (M1 1112 and M2 1114) are selected according to the indices with two tallest bars of histogram bars 1110. The three predictors (1140, 1142 and 1144) are used to form the blended prediction. The three predictors correspond to applying the M1, M2 and planar intra modes (1120, 1122 and 1124 respectively) to the reference pixels 1130 to form the respective predictors. The three predictors are weighted by respective weighting factors (@1, @2 and @3) 1150. The weighted predictors are summed using adder 1152 to generated the blended predictor 1160.

Besides, the two implicitly derived intra modes are included into the MPM list so that the DIMD process is performed before the MPM list is constructed. The primary derived intra mode of a DIMD block is stored with a block and is used for MPM list construction of the neighbouring blocks.

Template-based Intra Mode Derivation (TIMD)

Template-based intra mode derivation (TIMD) mode implicitly derives the intra prediction mode of a CU using a neighbouring template at both the encoder and decoder, instead of signalling the intra prediction mode to the decoder. As shown in FIG. 12, the prediction samples of the template (1212 and 1214) for the current block 1210 are generated using the reference samples (1220 and 1222) of the template for each candidate mode. A cost is calculated as the SATD (Sum of Absolute Transformed Differences) between the prediction samples and the reconstruction samples of the template. The intra prediction mode with the minimum cost is selected as the DIMD mode and used for intra prediction of the CU. The candidate modes may be 67 intra prediction modes as in VVC or extended to 131 intra prediction modes. In general, MPMs can provide a clue to indicate the directional information of a CU. Thus, to reduce the intra mode search space and utilize the characteristics of a CU, the intra prediction mode can be implicitly derived from the MPM list.

For each intra prediction mode in MPMs, the SATD between the prediction and reconstruction samples of the template is calculated. First two intra prediction modes with the minimum SATD are selected as the TIMD modes. These two TIMD modes are fused with weights after applying PDPC process, and such weighted intra prediction is used to code the current CU. Position dependent intra prediction combination (PDPC) is included in the derivation of the TIMD modes.

The costs of the two selected modes are compared with a threshold, in the test, the cost factor of 2 is applied as follows:

$$costMode2 < 2 * costMode1.$$

If this condition is true, the fusion is applied, otherwise only model is used. Weights of the modes are computed from their SATD costs as follows:

$$weight1 = costMode2 / (costMode1 + costMode2)$$
$$weight2 = 1 - weight1.$$

In the present disclosure, methods and apparatus to improve intra prediction mode using TIMD and DIMD are disclosed.

BRIEF SUMMARY OF THE INVENTION

A method and apparatus for video coding are disclosed. According to the method for the decoder side, coded data associated with a current block to be decoded is received. A curved intra prediction model associated with a curved intra prediction mode is determined for the current block, where the curved intra prediction model is derived based on a template of the current block or based on decoder side intra mode derivation using statistics or histogram of angle field derived from the template of the current block. The template comprises at least 3 lines in a neighbouring region of the current block. The current block is decoded using one or more intra prediction mode candidates including the curved intra prediction mode.

In one embodiment, one or more model parameters for the curved intra prediction model are determined based on the template of the current block or based on the decoder side intra mode derivation using the statistics or histogram of angle field derived from the template of the current block. In one embodiment, said one or more model parameters comprise one or more angle-turning parameters. In another embodiment, said one or more model parameters further comprise an angular speed parameter. In another embodiment, said one or more angle-turning parameters comprise an angle parameter and a turning direction parameter. The turning direction parameter indicates the turning direction as right turning versus left turning, or clockwise turning versus counter-clockwise turning. In another embodiment, said one or more model parameters comprise an angular speed parameter.

In one embodiment, one or more model parameters for the curved intra prediction model are parsed from a bitstream at the decoder side.

In one embodiment, a syntax is parsed from a bitstream at the decoder side to indicate whether the current block is coded using the curved intra prediction mode and the curved intra prediction model is determined based on the template of the current block or based on the decoder side intra mode derivation using the statistics or histogram of angle field derived from the template of the current block.

In one embodiment, a cost for each of a set of curved intra prediction modes is evaluated using the template of the current block, and a target curved intra prediction mode achieving a smallest cost among the set of curved intra prediction modes is selected to encode or decode the current block, and wherein the cost is evaluated between reconstructed samples of the template and predicted samples of the template derived for said each of the set of curved intra prediction modes.

In one embodiment, the statistics or histogram of angle field derived from the template of the current block are used to determine the curved intra prediction model. A gradient filter may be applied to the statistics or histogram of angle field derived from the template of the current block to determine the curved intra prediction model.

A corresponding method and apparatus for the encoder side have also been disclosed.

BRIEF DESCRIPTION OF THE DRAWINGS

FIG. 9 illustrate examples of two vertically-adjacent predicted samples using two non-adjacent reference samples in the case of wide-angle intra prediction.

FIG. 10A illustrates an example of selected template for a current block, where the template comprises T lines above the current block and T columns to the left of the current block.

FIG. 10B illustrates an example for T=3 and the HoGs (Histogram of Gradient) are calculated for pixels in the middle line and pixels in the middle column.

FIG. 10C illustrates an example of the amplitudes (ampl) for the angular intra prediction modes.

FIG. 13 illustrates an example of model parameters for curved intra prediction, where the curved intra prediction for a current block is indicated by dashed lines.

FIG. 14A illustrates an example of curved surface model corresponding to the surface of a paraboloid surface.

FIG. 14B illustrates an example of curved surface model corresponding to the surface of a hyperbolic paraboloid surface.

FIG. 15 illustrates an example of spread angle within a block, where the picture corresponds to a scene of a perspective view with a vanishing point close to the visible end of the road.

FIG. 19 illustrates a flowchart of an exemplary video decoding system that utilizes curved intra prediction according to an embodiment of the present invention.

Figure 1A:
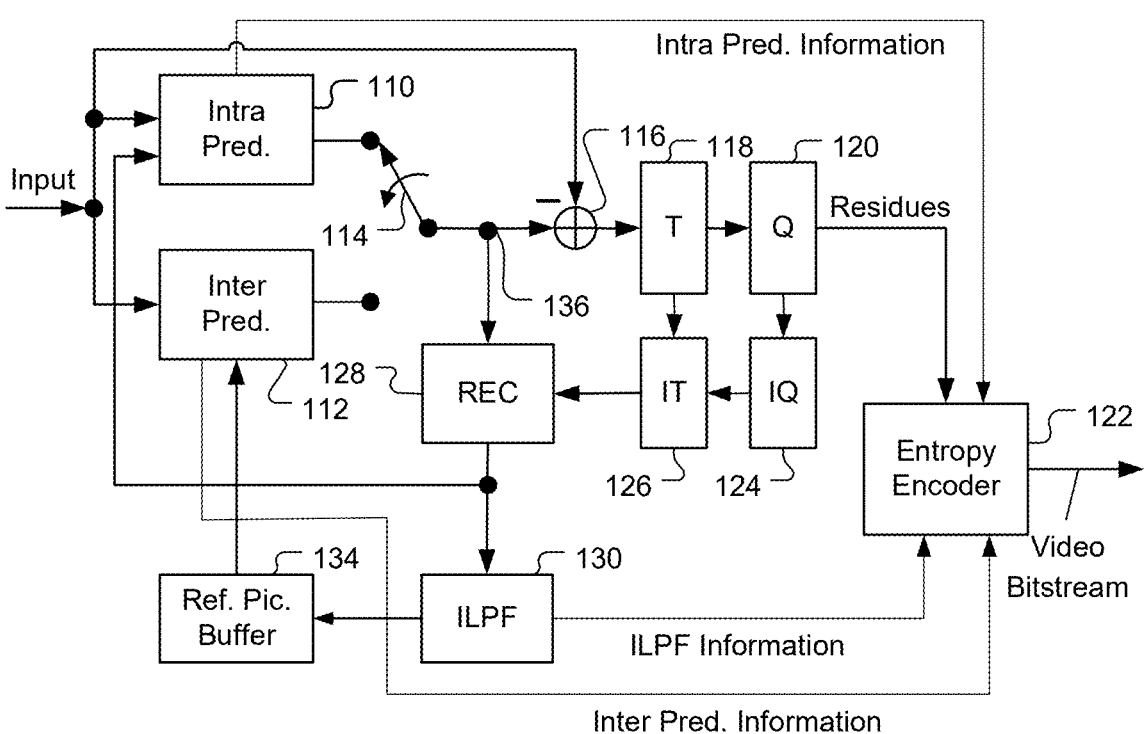
FIG. 1A illustrates an exemplary adaptive Inter/Intra video coding system incorporating loop processing.

DETAILED DESCRIPTION OF THE
INVENTION

It will be readily understood that the components of the present invention, as generally described and illustrated in the figures herein, may be arranged and designed in a wide variety of different configurations. Thus, the following more detailed description of the embodiments of the systems and methods of the present invention, as represented in the figures, is not intended to limit the scope of the invention, as claimed, but is merely representative of selected embodiments of the invention. References throughout this specification to "one embodiment," "an embodiment," or similar language mean that a particular feature, structure, or characteristic described in connection with the embodiment may be included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. One skilled in the relevant art will recognize, however, that the invention can be practiced without one or more of the specific details, or with other methods, components, etc. In other instances, well-known structures, or operations are not shown or described in detail to avoid obscuring aspects of the invention. The illustrated embodiments of the invention will be best understood by reference to the drawings, wherein like parts are designated by like numerals throughout. The following description is intended only by way of example, and simply illustrates certain selected embodiments of apparatus and methods that are consistent with the invention as claimed herein.

Method A: Curve Based Angle by Template Estimation

In this method, it is assumed that the intra-prediction angle is curved. Segmentation/content-analysis can be applied to the template in order to estimate a curved intra prediction model. In one embodiment, the encoder can send a mode flag (e.g. indicating the CU being coded using TIMD/DIMD based curved angle). In the decoder side, the decoder can use TIMD/DIMD to derive parameters of the curved intra prediction model.

According to one embodiment of the present invention, some model parameters can be defined, such as parameter of angle-turning and parameter of angular-speed. The parameters of angle-turning may include:

1. angle+"left-turning" (or, counter-clock-wise turning),
  2. angle+"right-turning" (or, clock-wise turning).

The parameters of angular-speed may include the speed of how the angle changes. In order to get the curved intra prediction model in the decoder side, it can use a thicker L-template (e.g. 10 lines or more) to apply TIMD-like method or DIMD-like method.

FIG. 13 illustrates an example of model parameters for curved intra prediction. The curved intra prediction for a current block 1310 is indicated by dashed lines 1320. The angle (or the entry angle) is indicated by arrow 1312 and the turning direction is indicated by arrow 1322.

For a TIMD-like method, it uses curved intra prediction model to perform/adjust template-matching and select the best curved intra prediction model. In DIMD method, it uses the statistics or histogram of the angle field inside the template (e.g. using gradient filter to guess the angle field of each sample on the template) to guess the curved intra prediction model.

In another embodiment, the encoder will decide the model parameters and send the curved intra prediction model parameters to the decoder.

Method B: DIMD for Curved Planar Mode

Instead of assuming the plane characteristics of luma values over different sample locations inside a current CU according to the original planar mode in VVC, the present invention discloses a more complicated surface model for luma (x,y), where the luma pixel value at (x, y) is described by a new model as z=function of (x, y), and the z, x, and y form a plane on Cartesian coordinates. For VVC's planar mode, the luma (x, y) is modelled by a function of (x, y), as z=ax+bry, where "a" and "b" depend on the current CU content.

However, for some large CUs, it is hard to find a pure "plane-surface" characteristics of content. Therefore, we propose a curved-surface form for "new planar mode". As mentioned above, the curved-surface form can also be described by z=function of (x, y). However, instead of a linear function, the curved-surface has a non-linear form such as higher order equations. For example, FIG. 14A shows a paraboloid surface as described by $z=x^2/a^2+y^2/b^2$. FIG. 14B shows a hyperbolic paraboloid surface as described by $z=x^2/a^2-y^2/b^2$. The curved surface can be defined in the encoder and the decoder. While two examples of curved surface are illustrated, the present invention is not limited to these specific examples. For example, the function is not necessarily limited to quadratic surface. Other types of formulas with different parameters may also be used. Furthermore, the two examples shown have the center of the surface located at the origin of the coordinate. Some offsets may be added to the center. Also the curved surface can be scaled and a CU can only be covered by a portion of the curved surface.

In one embodiment, the encoder can derive the best parameters (e.g. a and b for the examples in FIG. 14A and FIG. 14B, or other model parameters) and send to the decoder.

In another embodiment, L-shaped template can be used to derive the parameters on the decoder side. For example, without the parameter from the encoder, the decoder can adjust "a" and "b" to generate the predicted samples for L-shaped region (i.e., L-shaped neighbouring positions surrounding the current CU). The decoder then compares the predicted samples with the actual reconstructed samples of the L-shaped region. The measurement can be SAD (Sum of Absolute Differences) or other distortion matching computation. A set of parameters (e.g. "a" and "b" in the example of FIG. 14A and FIG. 14B) that achieves the minimum distortion is selected by the decoder as the set of decoder-derived parameters.

Method C: Spread-Angle Method and Characteristics

In VVC's conventional angular intra prediction mode, the prediction angle is a constant angle inside a current CU. However, some contents may have spread-angle characteristics, where the angle spreads over a range.

FIG. 15 illustrates an example of spread angle within a block 1500, where the picture corresponds to a scene of a perspective view with a vanishing point close to the visible end of the road. As evidenced by the noticeable lane lines (1510, 1520 and 1530) and a visible texture line (1540), the prediction-angle appears to continuously change from left to right inside the current CU. Therefore, one "spread-angle" intra mode would do a better prediction job for such contents and may help to improve compression efficiency for such contents.

Figure 16:
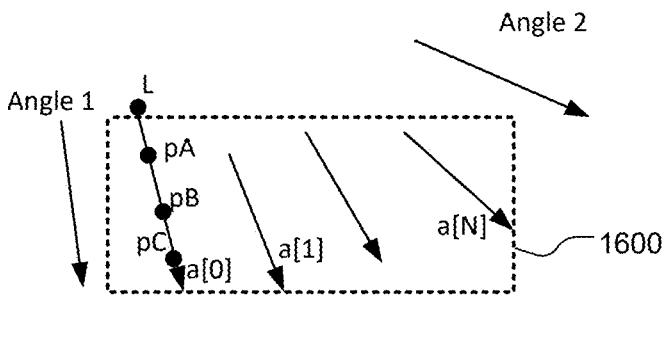
FIG. 16 illustrates an example of the "spread-angle" intra mode, where the prediction-angle continuously changes inside the current CU from angle 1 to angle 2.

FIG. 16 illustrates an example of the "spread-angle" intra mode. The prediction-angle will continuously change inside the current CU. In this example, angle 1 is the starting angle (of the left), and angle 2 is the ending angle (of the right), and there is a spread angle field comprising a [0], a [1], . . . a [N], where a [i] means the i-th angle inside the angle field and i=0, . . . , N. The prediction samples on or around the a [0] arrow will use the corresponding L-neighbouring reconstructed samples. For example, the predictor of pA, pB, pC will refer to the samples on the neighbouring pixel "L" or some samples on the neighbouring pixels around "L".

In one embodiment, the encoder can derive the best parameters (i.e., spread-angle parameters) and send to the decoder.

Figure 17A:
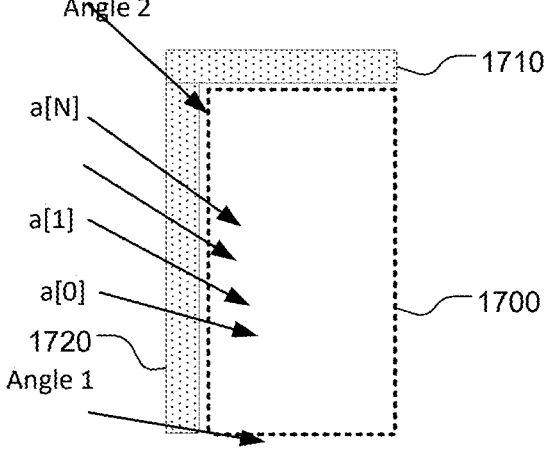
FIGS. 17A-B illustrate examples of evaluating costs associated with spread angles by adjust spread-angle parameters to generate the predicted samples using L-shape template for a tall CU (FIG. 17A) and a wide CU (FIG. 17B).
Figure 17B:
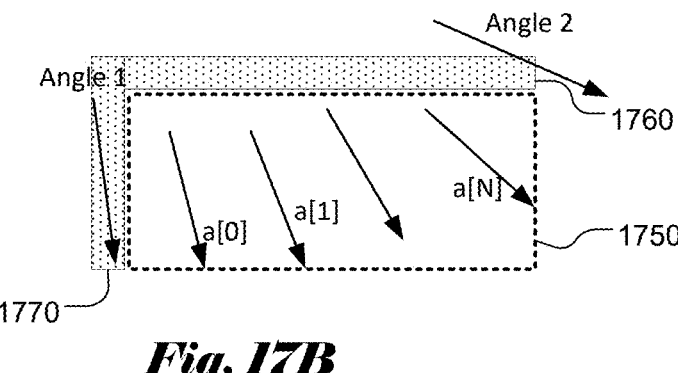

In another embodiment, the decoder can use the L-shaped template to derive the parameters in a manner similar to the encoder so that there is no need for signalling the parameters. For example, the decoder may use the following process to derive the parameters without the need for sending the parameter from the encoder:

Adjust spread-angle parameters to generate the predicted samples for L-shape template as shown in FIGS. 17A-B.
  Compare predicted samples with reconstructed samples on the L-region. For example, performing the SAD (or other distortion matching) computation.

Keep adjusting the spread-angle-parameters to find the minimum distortion (e.g. minimum SAD). Determine the parameters corresponding to the minimum distortion as the decoder-derived parameters.

The decoder can use the determined parameters to derive the spread-angle predictor for the current CU.

FIG. 17A and FIG. 17B illustrates examples of the decoder process to derive the spread-angle model parameters. In FIG. 17A, the L-shaped template (1710 and 1720) is shown for the current block 1700, and angle 1 (the starting angle at the bottom), angle 2 (the ending angle at the top) and the spread angle field (a [0], a [1], . . . a [N]) are indicated by arrows, where angle 1 and angle 2 are two intra prediction modes, and the intra prediction mode of angle 1 is less than the intra prediction mode of angle 2. In FIG. 17B, the L-shaped template (1760 and 1770) is shown for the current block 1750, and angle 1 (the starting angle on the left), angle 2 (the ending angle on the right-top) and the spread angle field (a [0], a [1], . . . a [N]) are indicated by arrows, where angle 1 and angle 2 are two intra prediction modes, and the intra prediction mode of angle 1 is greater than the intra prediction mode of angle 2.

In one embodiment, this mode is a sequence-dependent mode. Therefore, a syntax (e.g. an on/off signal) to indicate whether this mode is enabled can be included in the sequence header, and/or SPS (Sequence Parameter Set) header and/or picture header and/or tile header, and so on.

Method D: DIMD-based Intra Prediction Mode

This method is similar to the previous method (i.e., the spread-angle method) but with some modifications. In the previous method, the spread-angle parameter can be sent by the encoder, or derived using L-template at the decoder side. In the current method, it can use the neighbouring reconstructed intra-angle as a reference to derive the spread-angle parameters.

For example, according to this method, we can refer to the (reconstructed) intra-angle of left-neighbouring CU to derive the angle 1 and the (reconstructed) intra-angle of right-top neighbouring CU to derive angle 2 as shown in FIG. 17B. The spread-angle parameters can be derived based on angle 1 and angle 2.

Method E: Angle-Field Linear Regression Model

According to this method, it refers to more lines (more lines in L-neighbouring region) to predict the angle field linear model. For example, a plurality of angle fields on the L-neighbouring region (using TIMD or DIMD like method) are referred to derive the angle field based on the L-neighbouring template, and a linear regression method is used to derive the model parameters. It is assumed that there is one linear model (linear changing for the angle field) for intra angles inside the current CU.

Figure 18:
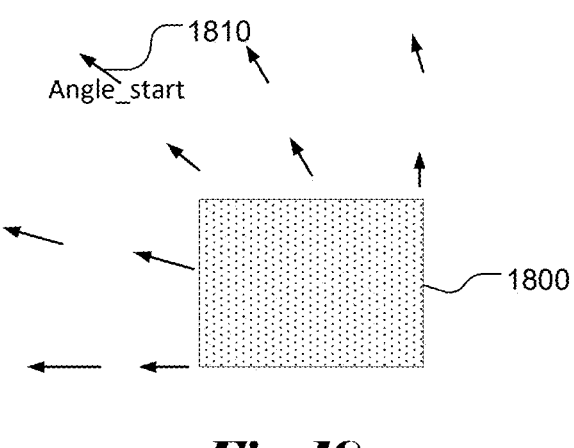
FIG. 18 illustrates an example of angle-field derivation using a linear regression model, where intra angles are generated from the reference region using DIMD, TIMD or other methods for a current block.

An example of angle-field derivation using a linear regression model is shown in FIG. 18. In the first step, a plurality of intra angles (as shown by arrows in FIG. 18) are generated from the reference region using DIMD, TIMD or other methods for a current block 1800. A linear regression model is derived from the angle field (i.e., the plurality of angles) with an initial angle, angle_start 1810 according to:

$$\text{Angle\_in\_CU}(x, y) = \text{angle\_start} + x * A + y * B + \text{offset}.$$

In the above equation, angle_start is an intra prediction mode used for the samples at the diagonal direction cross the above-left corner position of the current block, A is a scaling parameter to control the intra prediction mode increase or decrease scale in the horizontal direction, B is a scaling parameter to control the intra prediction mode increase or decrease scale in the vertical direction, and offset can be 0, a positive or negative value.

After the linear model is derived, we can derive the internal angle-vector field and use it for intra prediction.

Figure 1B:
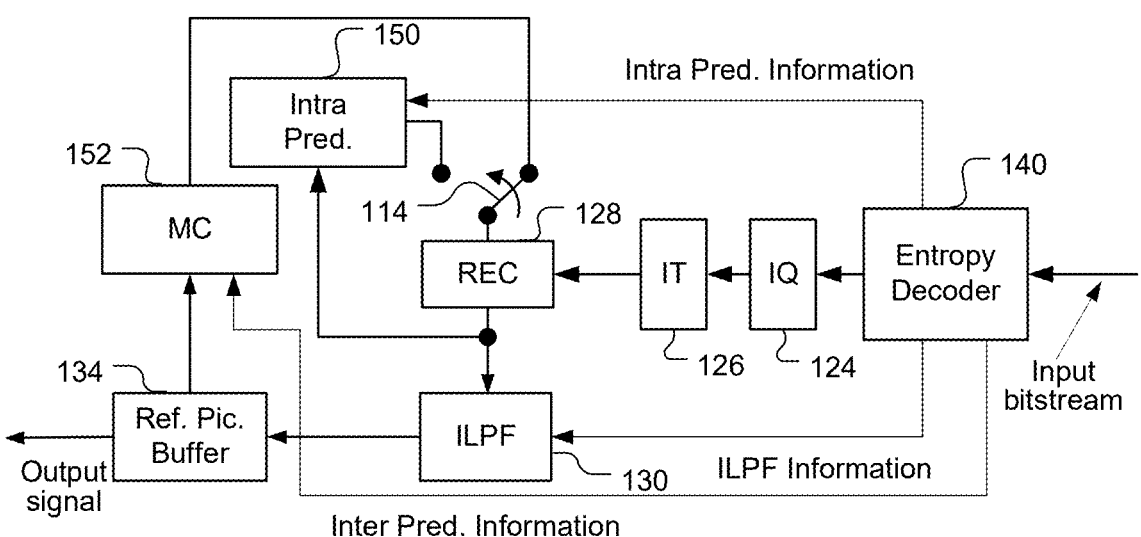
FIG. 1B illustrates a corresponding decoder for the encoder in FIG. 1A.
Figure 2:
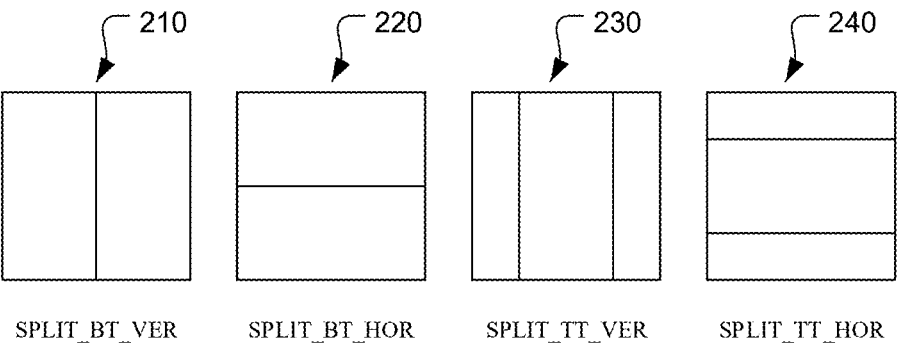
FIG. 2 illustrates examples of a multi-type tree structure corresponding to vertical binary splitting (SPLIT_BT_VER), horizontal binary splitting (SPLIT_BT_HOR), vertical ternary splitting (SPLIT_TT_VER), and horizontal ternary splitting (SPLIT_TT_HOR).
Figure 3:
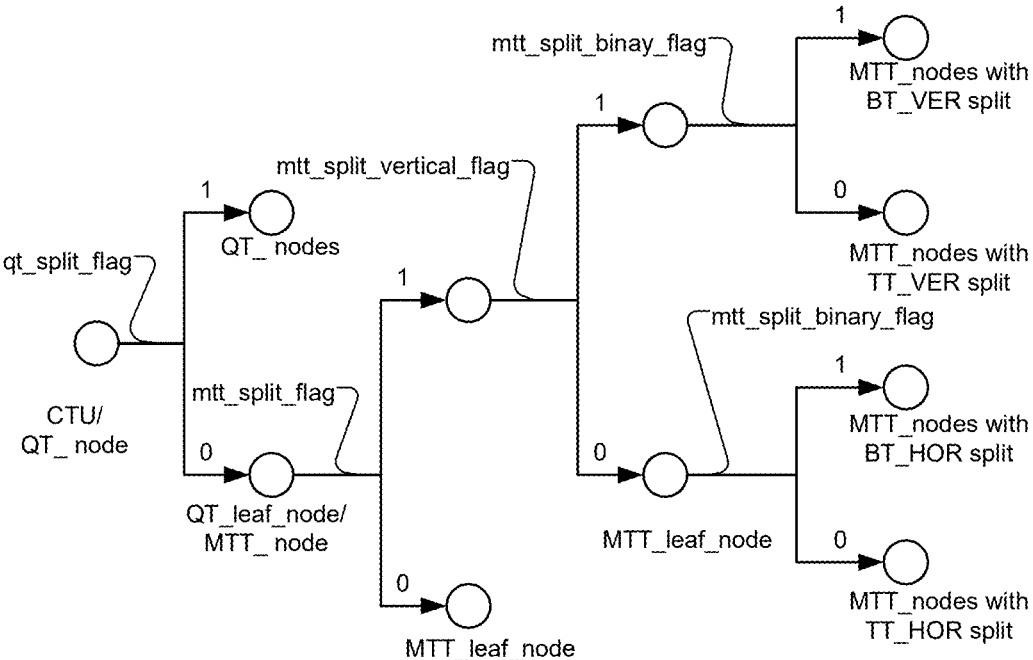
FIG. 3 illustrates an example of the signalling mechanism of the partition splitting information in quadtree with nested multi-type tree coding tree structure.
Figure 4:
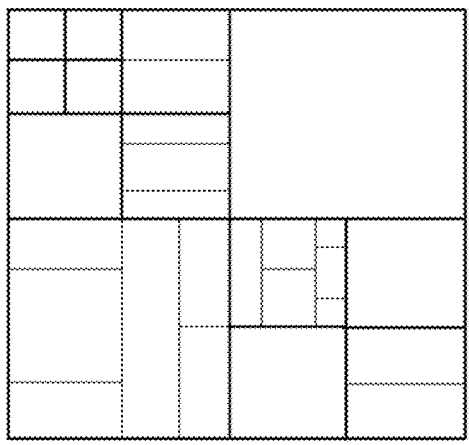
FIG. 4 shows an example of a CTU divided into multiple CUs with a quadtree and nested multi-type tree coding block structure, where the bold block edges represent quadtree partitioning and the remaining edges represent multi-type tree partitioning.
Figure 5:
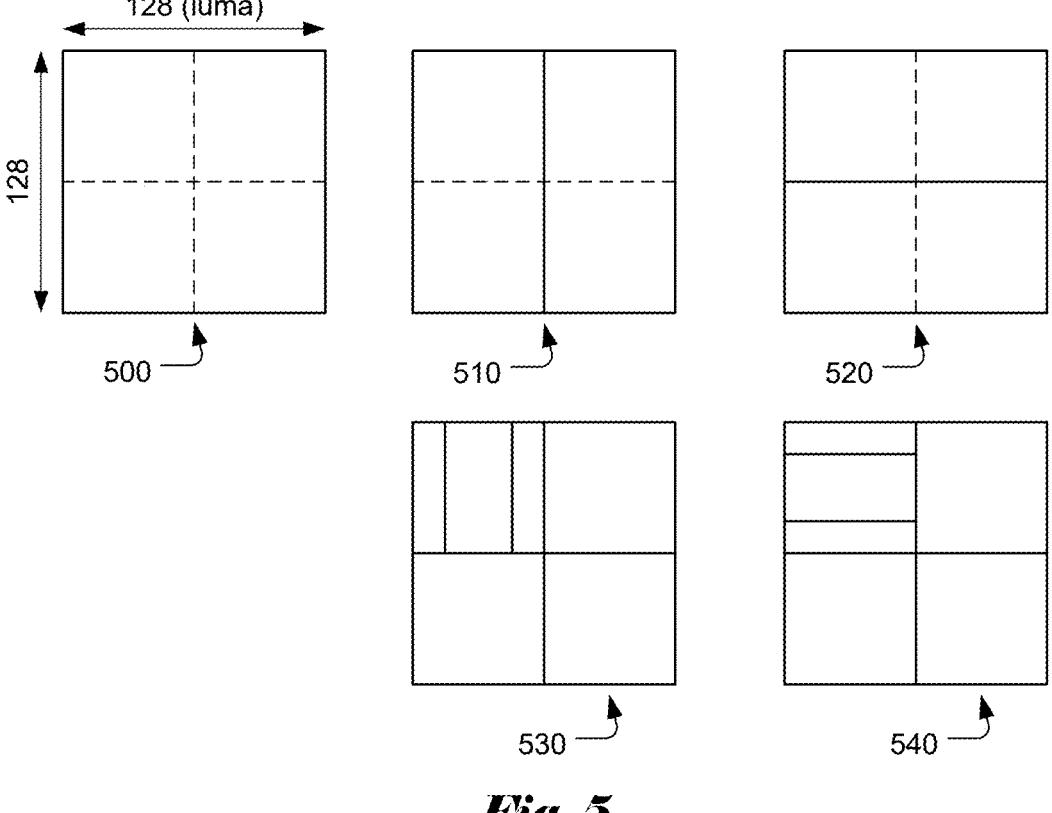
FIG. 5 shows an example of TT split forbidden when either width or height of a luma coding block is larger than 64.
Figure 6:
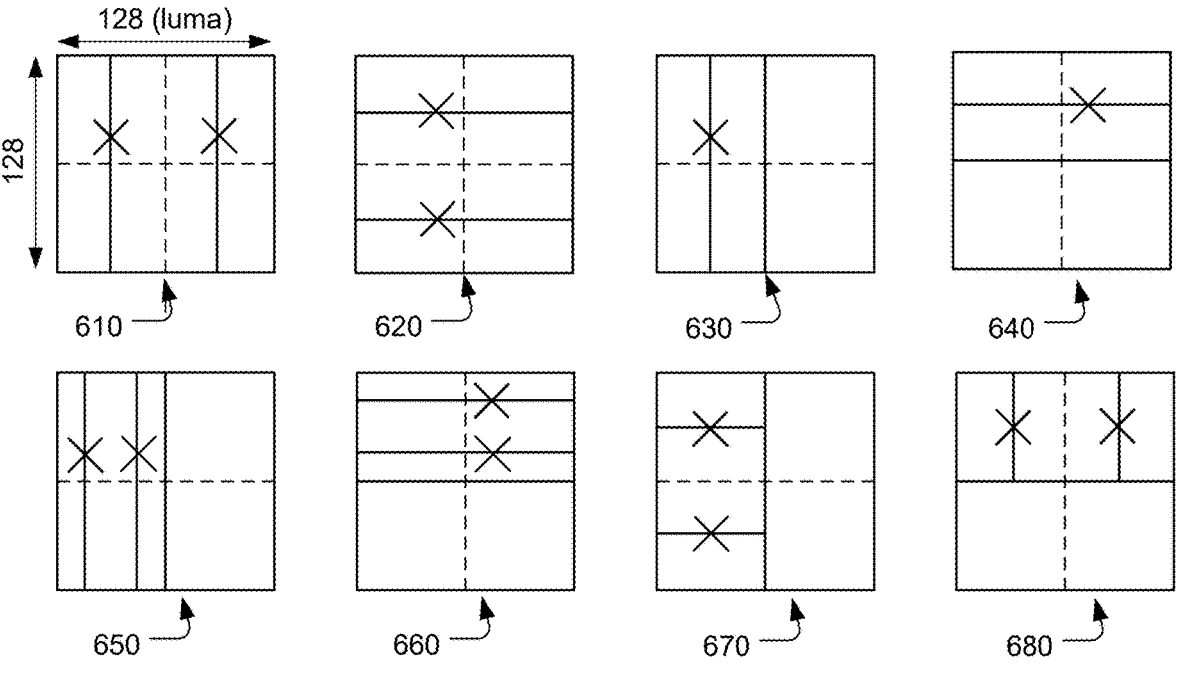
FIG. 6 shows some examples of TT split forbidden when either width or height of a luma coding block is larger than 64.
Figure 7:
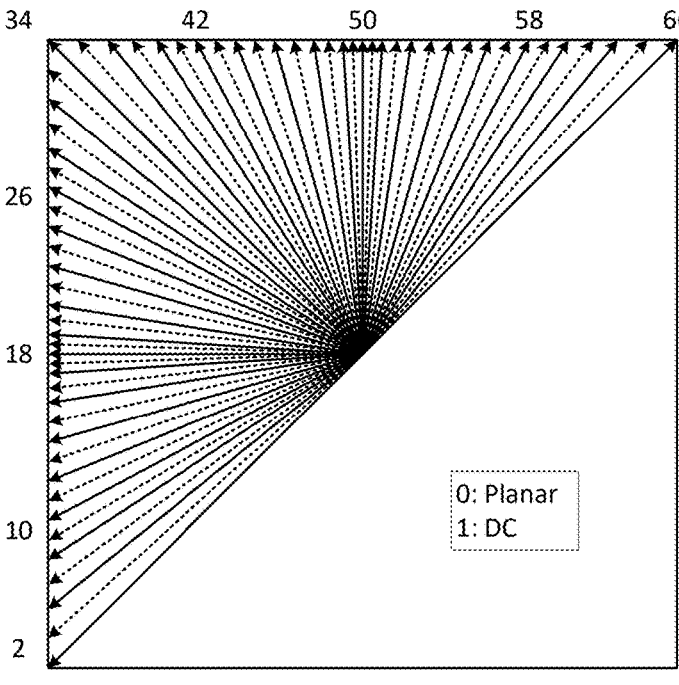
FIG. 7 shows the intra prediction modes as adopted by the VVC video coding standard.
Figure 8A:
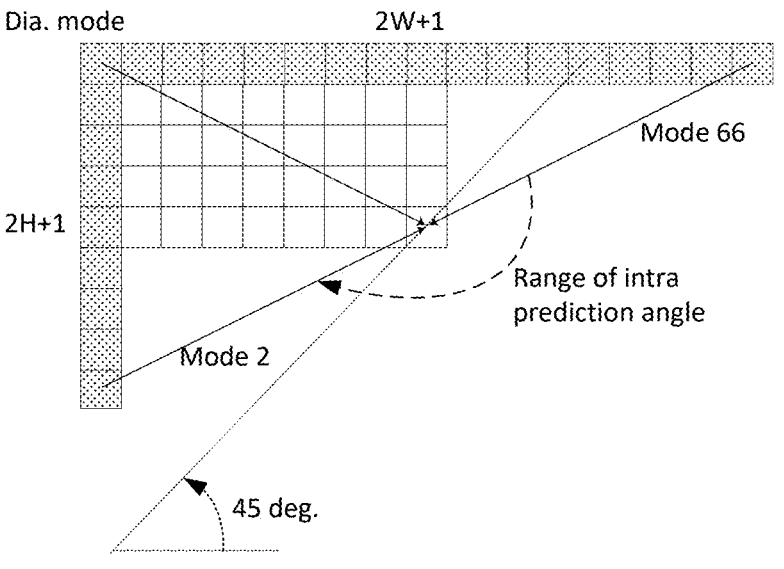
FIGS. 8A-B illustrate examples of wide-angle intra prediction a block with width larger than height (FIG. 8A) and a block with height larger than width (FIG. 8B).
Figure 8B:
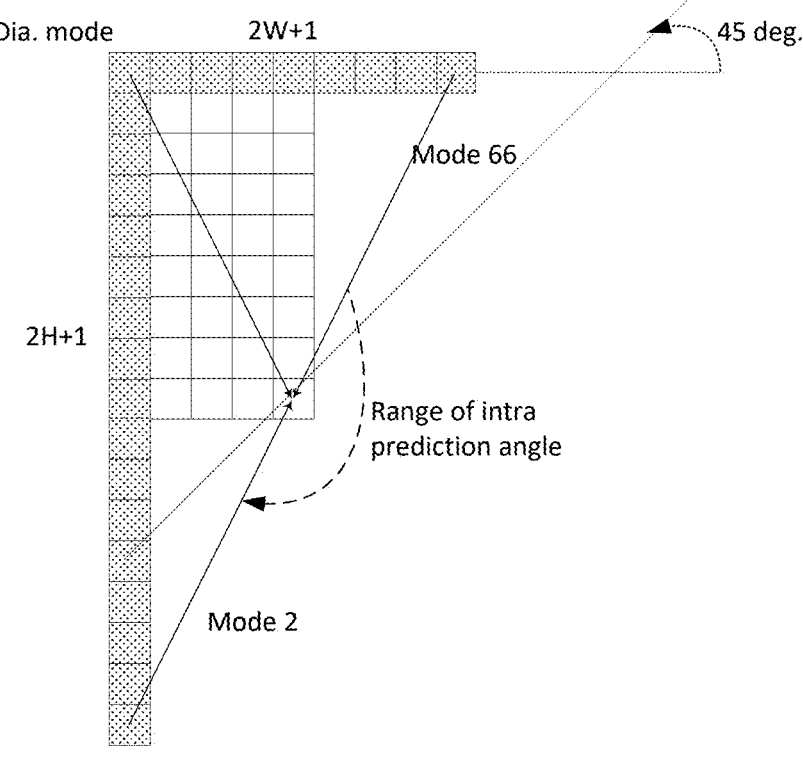
Figure 11:
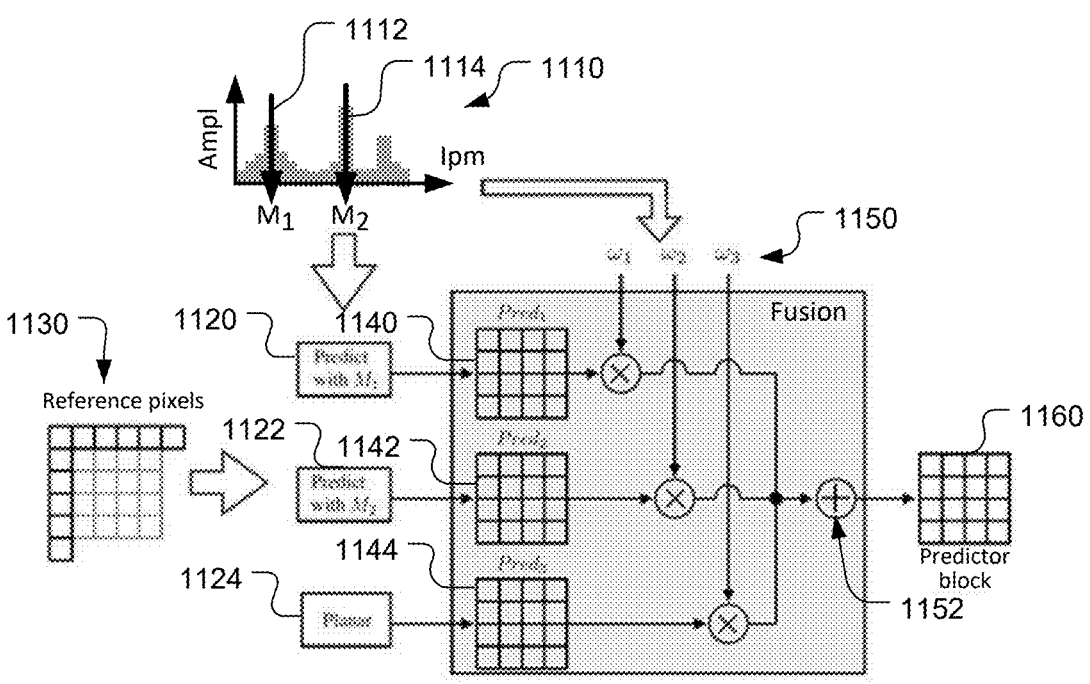
FIG. 11 illustrates an example of the blending process, where two intra modes (M1 and M2) and the planar mode are selected according to the indices with two tallest bars of histogram bars.
Figure 12:
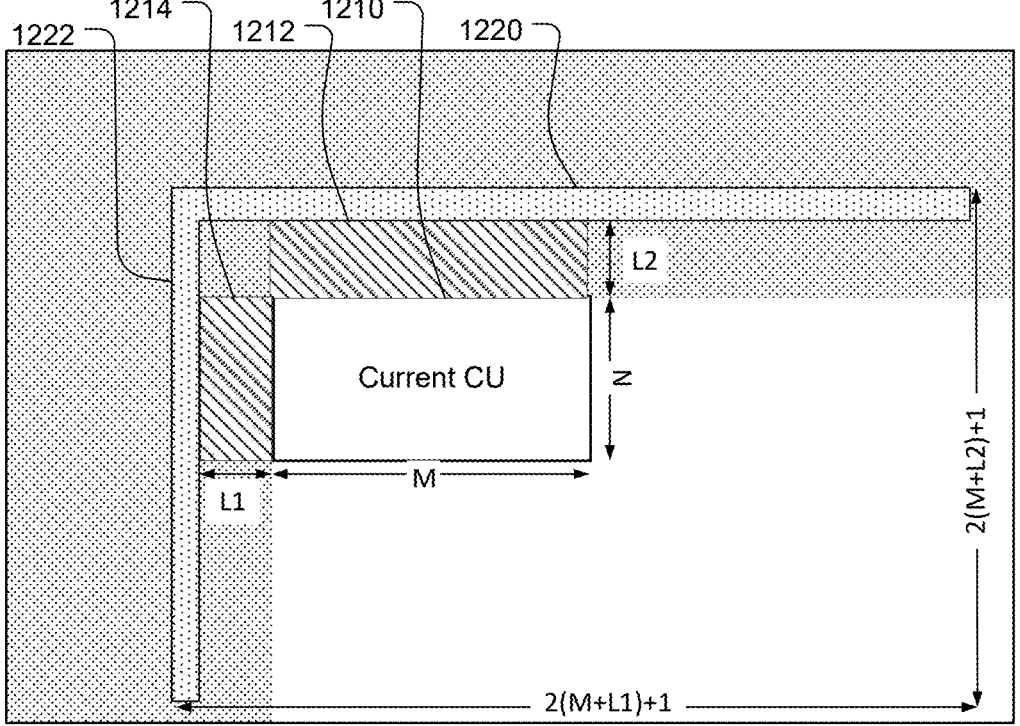
FIG. 12 illustrates an example of template-based intra mode derivation (TIMD) mode, where TIMD implicitly derives the intra prediction mode of a CU using a neighbouring template at both the encoder and decoder.

Any of the foregoing proposed methods can be implemented in encoders and/or decoders. For example, any of the proposed methods can be implemented in an intra (e.g. Intra 150 in FIG. 1B)/inter coding module of a decoder, a motion compensation module (e.g. MC 152 in FIG. 1B), a merge candidate derivation module of a decoder. Alternatively, any of the proposed methods can be implemented as a circuit coupled to the intra (e.g. Intra 110 in FIG. 1A)/inter coding module of an encoder and/or motion compensation module (e.g. MC 112 in FIG. 1B), a merge candidate derivation module of the encoder.

FIG. 19 illustrates a flowchart of an exemplary video decoding system that utilizes curved intra prediction according to an embodiment of the present invention. The steps shown in the flowchart may be implemented as program codes executable on one or more processors (e.g., one or more CPUs) at the encoder side. The steps shown in the flowchart may also be implemented based hardware such as one or more electronic devices or processors arranged to perform the steps in the flowchart. According to this method, coded data associated with a current block to be decoded at a decoder side is received in step 1910. A curved intra prediction model associated with a curved intra prediction mode is determined for the current block in step 1920, wherein the curved intra prediction model is derived based on a template of the current block or based on decoder side intra mode derivation using statistics or histogram of angle field derived from the template of the current block, and wherein the template comprises at least 3 lines in a neighbouring region of the current block. The current block is decoded using one or more intra prediction mode candidates including the curved intra prediction mode in step 1930.

Figure 20:
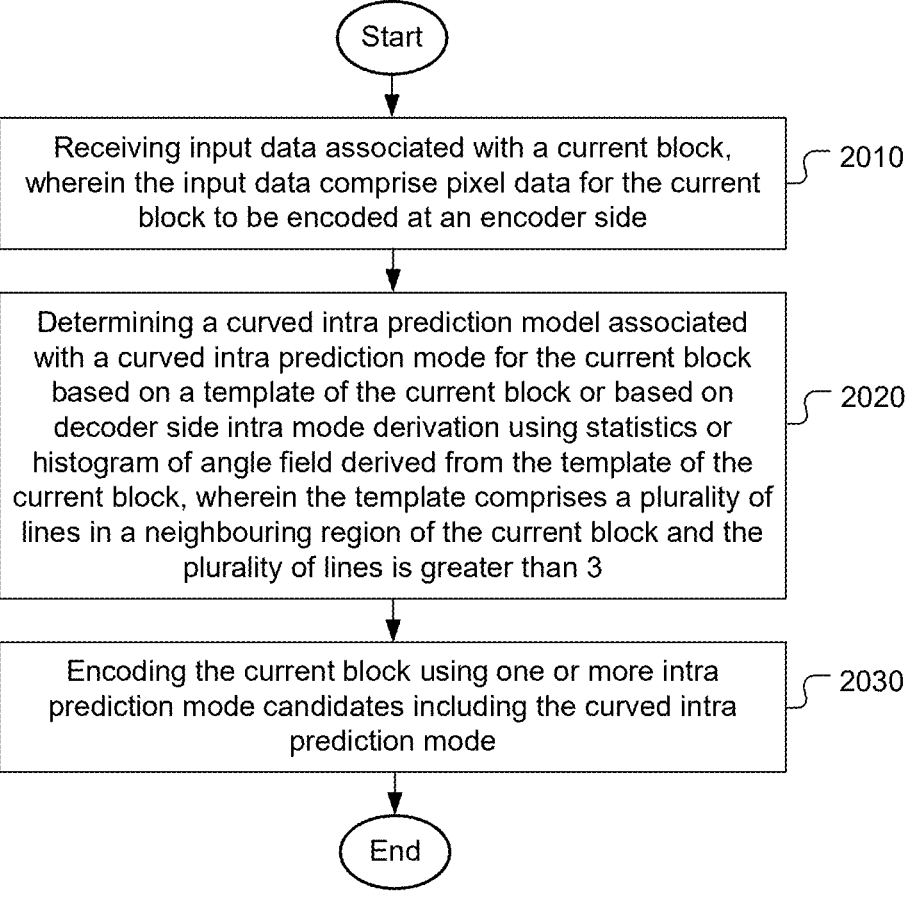
FIG. 20 illustrates a flowchart of an exemplary video encoding system that utilizes curved intra prediction according to an embodiment of the present invention.

FIG. 20 illustrates a flowchart of an exemplary video encoding system that utilizes curved intra prediction according to an embodiment of the present invention. According to this method, input data associated with a current block is received in step 2010, wherein the input data comprise pixel data for the current block to be encoded at an encoder side. A curved intra prediction model associated with a curved intra prediction mode is determined for the current block based on a template of the current block or based on decoder side intra mode derivation using statistics or histogram of angle field derived from the template of the current block in step 2020, wherein the template comprises at least 3 lines in a neighbouring region of the current block. The current block is encoded using one or more intra prediction mode candidates including the curved intra prediction mode in step 2030.

The flowcharts shown are intended to illustrate an example of video coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more circuit circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of video decoding, the method comprising:
receiving coded data associated with a current block to be decoded at a decoder side;
determining a curved intra prediction model associated with a curved intra prediction mode for the current block, wherein the curved intra prediction model is derived based on a template of the current block or based on decoder side intra mode derivation using statistics or histogram of angle field derived from the template of the current block, and wherein the template comprises at least 3 lines in a neighbouring region of the current block; and
decoding the current block using one or more intra prediction mode candidates including the curved intra prediction mode.

2. The method of claim 1, wherein one or more model parameters for the curved intra prediction model are determined based on the template of the current block or based on the decoder side intra mode derivation using the statistics or histogram of angle field derived from the template of the current block.

3. The method of claim 2, wherein said one or more model parameters comprise one or more angle-turning parameters.

4. The method of claim 3, wherein said one or more model parameters further comprise an angular speed parameter.

5. The method of claim 3, wherein said one or more angle-turning parameters comprise an angle parameter and a turning direction parameter.

6. The method of claim 5, wherein the turning direction parameter indicates a turning direction as right turning versus left turning, or clockwise turning versus counter-clockwise turning.

7. The method of claim 2, wherein said one or more model parameters comprise an angular speed parameter.

8. The method of claim 1, wherein one or more model parameters for the curved intra prediction model are parsed from a bitstream.

9. The method of claim 1, wherein a syntax is parsed from a bitstream at the decoder side to indicate whether the current block is coded using the curved intra prediction mode, and the curved intra prediction model is determined based on the template of the current block or based on the decoder side intra mode derivation using the statistics or histogram of angle field derived from the template of the current block.

10. The method of claim 1, wherein a cost for each of a set of curved intra prediction modes is evaluated using the template of the current block, and a target curved intra prediction mode achieving a smallest cost among the set of curved intra prediction modes is selected to encode or decode the current block, and wherein the cost is evaluated between reconstructed samples of the template and predicted samples of the template derived for said each of the set of curved intra prediction modes.

11. The method of claim 1, wherein the statistics or histogram of angle field derived from the template of the current block are used to determine the curved intra prediction model.

12. The method of claim 11, wherein a gradient filter is applied to the statistics or histogram of angle field derived from the template of the current block to determine the curved intra prediction model.

13. A method of video encoding, the method comprising:
receiving input data associated with a current block, wherein the input data comprise pixel data for the current block to be encoded at an encoder side;
determining a curved intra prediction model associated with a curved intra prediction mode for the current block based on a template of the current block or based on decoder side intra mode derivation using statistics or histogram of angle field derived from the template of the current block, wherein the template comprises at least 3 lines in a neighbouring region of the current block; and
encoding the current block using one or more intra prediction mode candidates including the curved intra prediction mode.

14. The method of claim 13, wherein a syntax is signalled in a bitstream at the encoder side to indicate whether the current block is coded using the curved intra prediction mode and the curved intra prediction model are determined based on the template of the current block or based on the decoder side intra mode derivation using the statistics or histogram of angle field derived from the template of the current block.

15. The method of claim 13, wherein one or more model parameters for the curved intra prediction model are signalled in a bitstream comprising coded data associated with the current block.

16. The method of claim 13, wherein a cost for each of a set of curved intra prediction modes is evaluated using the template of the current block, and a target curved intra prediction mode achieving a smallest cost among the set of curved intra prediction modes is selected to encode or decode the current block, and wherein the cost is evaluated between reconstructed samples of the template and predicted samples of the template derived for said each of the set of curved intra prediction modes.

17. The method of claim 13, wherein the statistics or histogram of angle field derived from the template of the current block are used to determine the curved intra prediction model.

18. An apparatus for video decoding, the apparatus comprising one or more electronics or processors arranged to:
    receive coded data associated with a current block to be decoded at a decoder side;
    determine a curved intra prediction model associated with a curved intra prediction mode for the current block, wherein the curved intra prediction model is derived based on a template of the current block or based on decoder side intra mode derivation using statistics or histogram of angle field derived from the template of the current block, and wherein the template comprises at least 3 lines in a neighbouring region of the current block; and
    decode the current block using one or more intra prediction mode candidates including the curved intra prediction mode.

19. An apparatus for video encoding, the apparatus comprising one or more electronics or processors arranged to:
    receive input data associated with a current block, wherein the input data comprise pixel data for the current block to be encoded at an encoder side;
    determine a curved intra prediction model associated with a curved intra prediction mode for the current block based on a template of the current block or based on decoder side intra mode derivation using statistics or histogram of angle field derived from the template of the current block, wherein the template comprises a plurality of lines in a neighbouring region of the current block and the plurality of lines is greater than 3; and
    encode the current block using one or more intra prediction mode candidates including the curved intra prediction mode.

* * * * *